(12) United States Patent
Wang

(10) Patent No.: US 8,866,768 B2
(45) Date of Patent: Oct. 21, 2014

(54) TOUCH TRACKING DEVICE AND METHOD FOR A TOUCH SCREEN

(75) Inventor: Wan-Qiu Wang, Singapore (SG)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 254 days.

(21) Appl. No.: 13/367,371

(22) Filed: Feb. 7, 2012

(65) Prior Publication Data

US 2013/0021272 A1 Jan. 24, 2013

(30) Foreign Application Priority Data

Jul. 22, 2011 (CN) .......................... 2011 1 0212538

(51) Int. Cl.
*G06F 3/041* (2006.01)

(52) U.S. Cl.
CPC .................................... *G06F 3/0416* (2013.01)
USPC .......................................................... 345/173

(58) Field of Classification Search
None
See application file for complete search history.

(56) References Cited

U.S. PATENT DOCUMENTS

| | | | |
|---|---|---|---|
| 2009/0073131 A1 | 3/2009 | Yeh | |
| 2010/0073318 A1 | 3/2010 | Hu et al. | |
| 2010/0097342 A1* | 4/2010 | Simmons et al. | 345/174 |
| 2012/0206380 A1* | 8/2012 | Zhao et al. | 345/173 |
| 2012/0223894 A1* | 9/2012 | Zhao et al. | 345/173 |

FOREIGN PATENT DOCUMENTS

CN 101105733 A 1/2008

* cited by examiner

*Primary Examiner* — Adam R Giesy
(74) *Attorney, Agent, or Firm* — Gokalp Bayramoglu

(57) ABSTRACT

A touch tracking method for the touch screen is provided. A touch tracking method for a touch track on a touch screen comprises the steps of: defining a touch track function by information of detected touch points; calculating a predicted touch point by said touch track function; determining if a next detected touch point is located in a preset scope of said predicted touch point; and if the next detected touch point is located in the preset scope of the predicted touch point, outputting the predicted touch point as an output touch point. A touch tracking device for a touch track on a touch screen is also provided. The touch tracking device for the touch screen can, not only determine relationship between detected touch points at different detected times to draw the touch tracks, but can also make the touch track smooth and help eliminate noise point effectively.

13 Claims, 9 Drawing Sheets

TOUCH TRACKING DEVICE AND METHOD FOR A TOUCH SCREEN

BACKGROUND OF THE INVENTION

This application claims the benefit of the People's Republic of China Application No. 201110212538.5, filed on Jul. 22, 2011.

FIELD OF THE INVENTION

The present disclosure relates to a tracking method and a touch tracking device. More particularly, the present disclosure relates to a touch tracking method and a touch tracking device for a touch screen.

DESCRIPTION OF THE RELATED ART

The technologies for inputting data into electronic devices such as laptop and cell phone through touch screens of the devices are widely used. At present, according to the different touch point detecting principles, a touch screen can be classified into resistive-type, capacitive-type, optical-type, electromagnetic-type, acoustic-type and the like. In operation, the touch screen generates touch input signals based on positions of touch points, after which the touch input signals are then processed to present relative information on the electronic device, for instance, to display relative information on a monitor.

To enable a touch screen, it is very important to determine position of the touch points. Taking a projected capacitive touch screen as an example, the capacitive touch screen is mainly comprises of two directional electrodes, wherein the two directional electrodes are mutually perpendicular and separated by an insulating layer. Coordinates of the touch points are determined by detecting and processing the touch signals generated on the two directional electrodes. When a touch point is static, determining the position of the touch point is sufficient but when the touch point is dynamic, for instance, when a touch object continuously moves on a surface of the touch screen, position of the touch point changes with respect to time, thereby forming multiple touch points. If the position of each single touch point is determined independently in the static condition, determining a relationship between one touch point and other touch points is not possible. For instance, a touch point A is detected at a first detecting time, while a touch point B is detected at a second detecting time. Only the positions of the single touch points, A and B can be determined, but relationship between the touch point A and touch point B cannot be determined in accordance with a traditional detecting method of the static touch points mentioned above. Moreover, a touch track is also hard to draw. If a noise point exists, for example, when a noise point C exists at the second time point, the process of determining and eliminating the noise point C makes determining of the touch track more complex. In other words, it is difficult to track dynamic touch points.

SUMMARY OF THE INVENTION

An objective of the present disclosure is to provide a touch tracking method for a touch screen. A touch tracking function, defined by detected touch points, is used for predicting a next touch point while tracking dynamic touch points. The touch tracking function not only determines relationship between the detected touch points at different detecting times to draw a touch track, but also makes the touch track smooth and helps eliminate noise points effectively.

A touch tracking method for a touch track on a touch screen comprises the steps of a) defining a touch track function by information of detected touch points; b) calculating a predicted touch point by said touch track function; c) determining whether a next detected touch point is located within a preset scope of said predicted touch point; and d) if yes in said step (c), outputting said predicted touch point in accordance with said next detected touch point as output touch point.

In one implementation, the number of said detected touch points is not less than 3, and said information of said detected touch points includes coordinates and detecting times of said detected touch points.

A touch tracking method for a touch track on a touch screen comprises the steps of: a) detecting coordinates and detecting times of n detected touch points P1~Pn, P1(x1, y1, t1), P2(x2, y2, t2) . . . Pn(xn, yn, tn), wherein n is not less than 3; b) defining a touch track function F(x, y, t) by said coordinates and detecting times (x1, y1, t1), (x2, y2, t2) . . . (xn, yn, tn) for n detected touch points; c) calculating a predicted touch point Pn+1' by said touch track function for n detected touch point; d) determining whether the detected touch point Pn+1 is located in a preset scope of said predicted touch point 'Pn+1'; and e) if yes in said step (d), outputting said predicted touch point Pn+1' as an output touch point.

Another objective of the present invention is to provide a touch tracking device for a touch screen. The touch tracking device for a touch track on the touch screen comprises of: an acquisition unit to detect information of detected touch points; and a controlling unit connected to said acquisition unit to define a touch track function by said information of said detected touch points, calculating a predicted touch point, determining whether a following detected touch point is located in a preset scope of said predicted touch point and if yes, outputting said predicted touch point as an output touch point.

BRIEF DESCRIPTION OF THE DRAWINGS

The skilled artisan will understand that the drawings, described below, are for illustration purposes only. The drawings are not intended to limit the scope of the present teachings in any way. Like reference numerals designate corresponding parts throughout the several views.

DETAILED DESCRIPTION OF THE EMBODIMENTS

Figure 1:
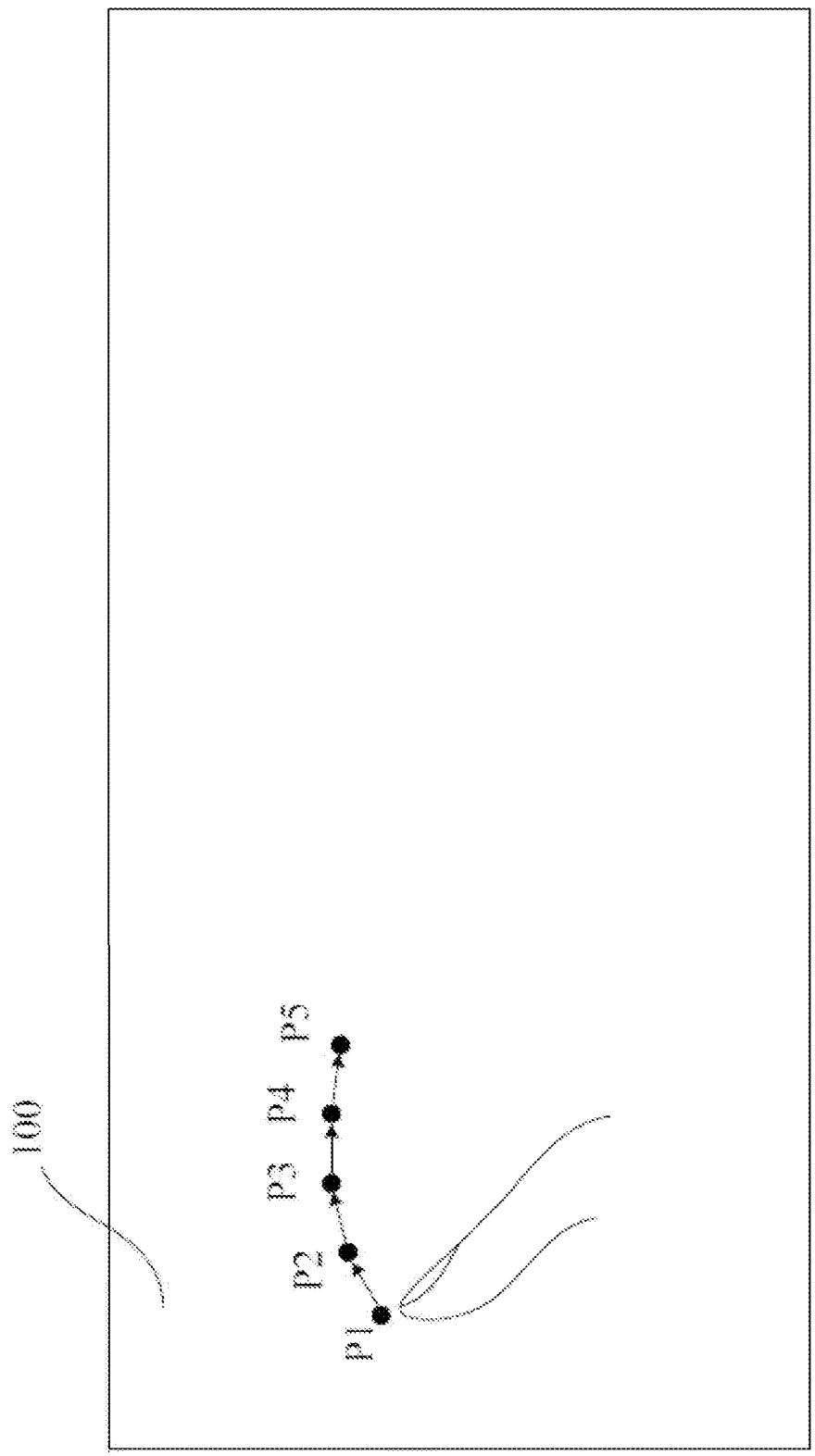
FIG. 1 is a schematic diagram of a first embodiment for determining a touch track on a touch screen of the present disclosure.

As shown in FIG. 1, a touch object, such as a finger or a stylus, moves on surface of a touch screen 100 to produce successive 5 detected touch points P1, P2, P3, P4, and P5 at 5 successive detecting times. Each detected touch point has a coordinate (x, y) and a detecting time t. Therefore, all detected touch points have following parameters: (x1, y1, t1), (x2, y2, t2), (x3, y3, t3), (x4, y4, t4) and (x5, y5, t5). In addition, all detected touch points are generated by movement of the touch object, wherein the touch object has a relevant velocity and a relevant acceleration with respect to each detected touch point, wherein the relevant velocity and relevant acceleration of the touch object can be calculated based on above mentioned coordinates and detecting time of each touch point. Therefore, a touch track function F(x, y, t) can be defined based on the coordinates and the detecting time of the detected touch points.

An example is taken to illustrate a touch track function F(x,y,t):

$$X_{new} = X_{old} + \frac{1}{2}\bar{a}_x \Delta t^2 + \bar{V}_x \Delta t$$

$$Y_{new} = Y_{old} + \frac{1}{2}\bar{a}_y \Delta t^2 + \bar{V}_y \Delta t$$

wherein, $(X_{new}, Y_{new})$ is coordinate of a new tracking point on a touch track and $(X_{old}, Y_{old})$ is coordinate of an old tracking point on the touch track (i.e the coordinate of the tracking point at the last detecting time). $\bar{a}_x$ and $\bar{a}_y$ are average acceleration values across coordinate axis of several preceding tracking points (for instance, taking 5 tracking points) along X and Y coordinate axial directions respectively. $\bar{V}_x$ and $\bar{V}_y$ are average velocity values of the preceding several tracking points (for instance, taking 5 tracking points) among the new tracking points along the X and Y coordinate axial directions. $\Delta t$ is time interval between two adjacent tacking points (for instance, time interval between two detecting times). Moreover, $\bar{a}_x$ and $\bar{a}_y$ can also be average acceleration values of the preceding several tracking points (for instance, taking 5 tracking points) along X and Y coordinate axial directions respectively, after cutting the maximum acceleration and the minimum acceleration. $\bar{V}_x$ and $\bar{V}_y$ can also be average velocity values of the preceding several tracking points (for instance, taking 5 tracking points) along X and Y coordinate axial directions respectively, after cutting the maximum velocity and the minimum velocity.

In an embodiment, acceleration and the velocity values can be calculated by the following approximate method. From a tracking point P1 to a tracking point P2 shown in FIG. 1, a touch object can be treated as a uniform velocity motion (acceleration from P1 to P2 is zero). Velocities of P1 and P2 can be calculated by known coordinates and times of the tracking points P1 and P2. From the tracking point P2 to a tracking point P3, the touch object can be in uniform acceleration motion, and then the acceleration from P2 to P3 and the velocity of P3 can be calculated by a known coordinate and time of P3. Similarly, acceleration of P3, and velocities and accelerations of P4 and P5 can be calculated. If a touch track function F(x, y, t) is defined based on the above-mentioned 5 tracking points from P1 to P5, then these 5 tracking points are successively detected touch points occurring on the surface of the touch screen 100.

In addition, the touch track function F(x, y, t) can be defined by any other formula.

The above-mentioned touch track function F(x, y, t) can be used to predict coordinates of predicted touch points on the touch track. That is to say, after acquiring information of the detected touch points, the touch track function is defined by the acquired information of the detected touch points. Predicted touch points can then be calculated based on the touch track function. Further to computation of the predicted touch points, it can be determined as to whether the next detected touch point is in the preset scope of a concerned predicted touch point. If yes, the predicted touch point in accordance with the next detected touch point is outputted as output touch point.

Figure 2:
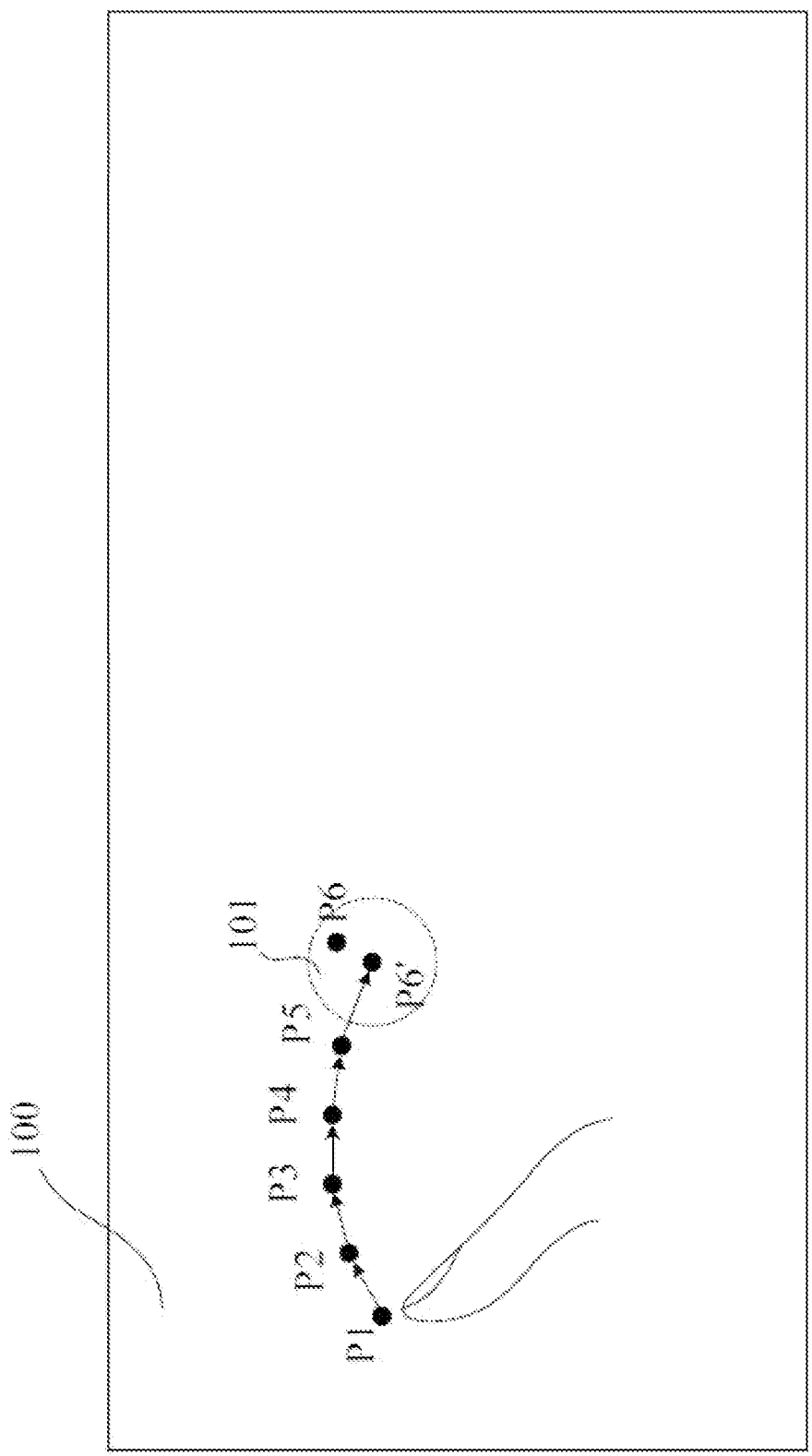
FIG. 2 is a schematic diagram of a predicted touch point and a detected touch point on the touch track in FIG. 1.

For instance, as shown in FIG. 2, predicted parameter (x6', y6', t6') of P6', which is a predicted touch point, can be calculated by a touch track function F(x, y, t). The preset scope 101 can be set based on the predicted touch point P6'. Coordinate (x6, y6) of a detected touch point P6 is detected to be within the preset scope 101, and therefore the touch track function F(x, y, t) is determined to be correct and maintained to be valid. Meanwhile, the predicted touch point P6' is outputted as the output touch point, which means that the predicted touch point P6' is outputted to a system or an application program as a touch point is being actually touched. In an embodiment, the above-mentioned preset scope 101 can be set by various methods. Two examples are taken to illustrate: first, that the preset scope 101 is a circle formed by taking the predicted touch point P6' as the center of the circle and taking half of the distance between the last detected touch point. P5 and the predicted touch point P6' as the radius; second, the preset scope 101 is a circle formed by taking the predicted touch point P6' as the center of the circle and taking detecting empirical value as the radius.

Figure 3:
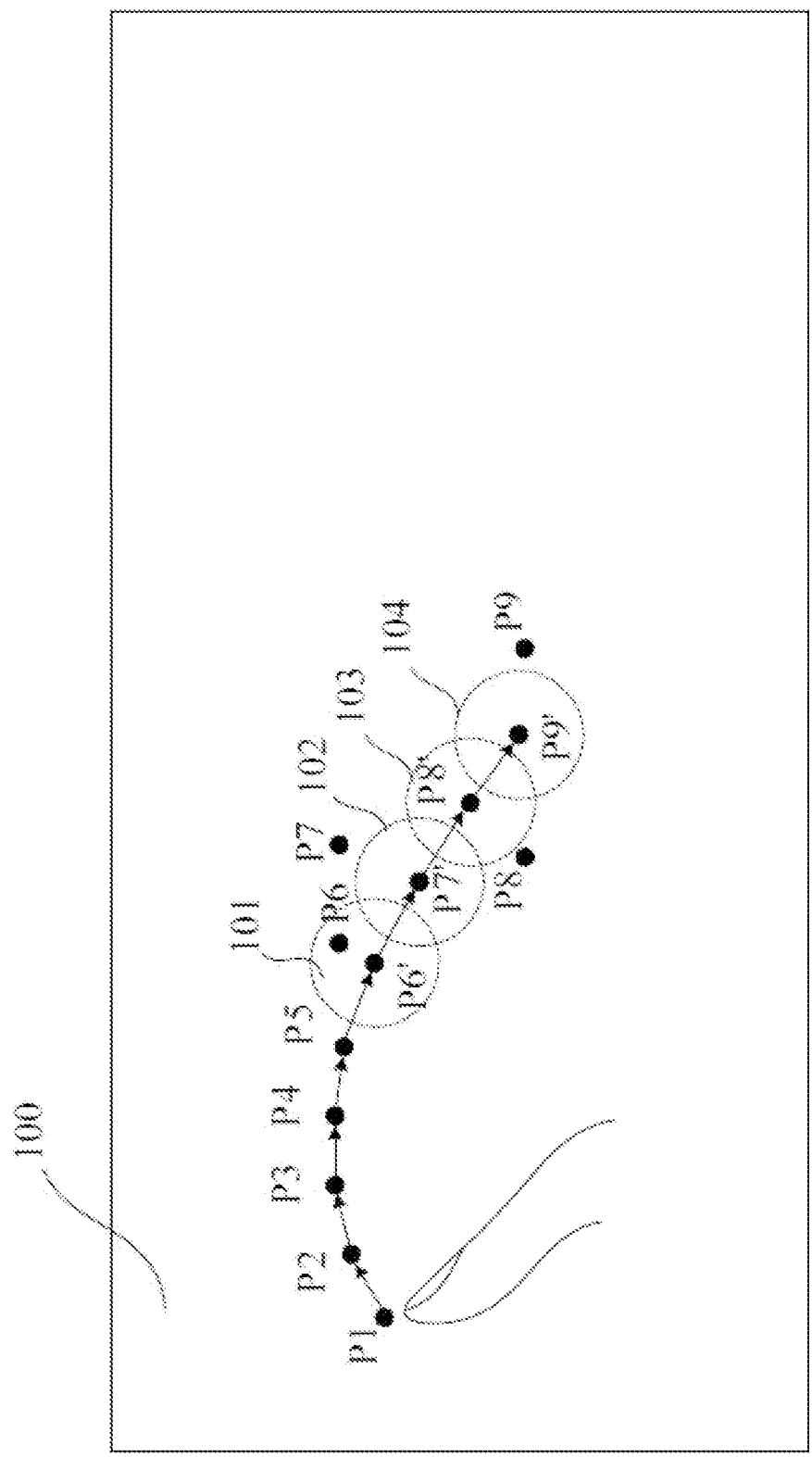
FIG. 3 is a schematic diagram of the end of the touch track in FIG. 1.

By the above-mentioned method, each following detected touch point is determined based on its location with respect to the preset scope of corresponding predicted touch point. If all of the several detected touch points are not located in the preset scopes of their corresponding predicted touch points, the touch track is determined to end at the predicted touch point corresponding to the first detected touch point of those several detected touch points. For example, as shown in FIG. 3, predicted parameter (x7', y7', t7') of a predicted touch point P7' is calculated by touch track function F(x, y, t), and preset scope 102 is set based on the predicted touch point P7'. Coordinate (x7, y7) of a detected touch point P7 is detected to locate beyond the preset scope 102. In the same way, predicted parameter (x8', y8' t8') of predicted touch point P8' continues to be calculated, and preset scope 103 is set based on the predicted touch point P8'. The coordinate (x8, y8) of a detected touch point P8 is detected to locate beyond the preset scope 103. Likewise, predicted parameter (x9', y9', t9') of a predicted touch point P9' continues to be calculated, and preset scope 104 is set based on the predicted touch point P9'. Coordinate (x9, y9) of a detected touch point P9 is detected to locate beyond the preset scope 104. Thus, this touch track is determined to end at the predicted touch point P7' which is outputted as the ending touch point.

Figure 4:
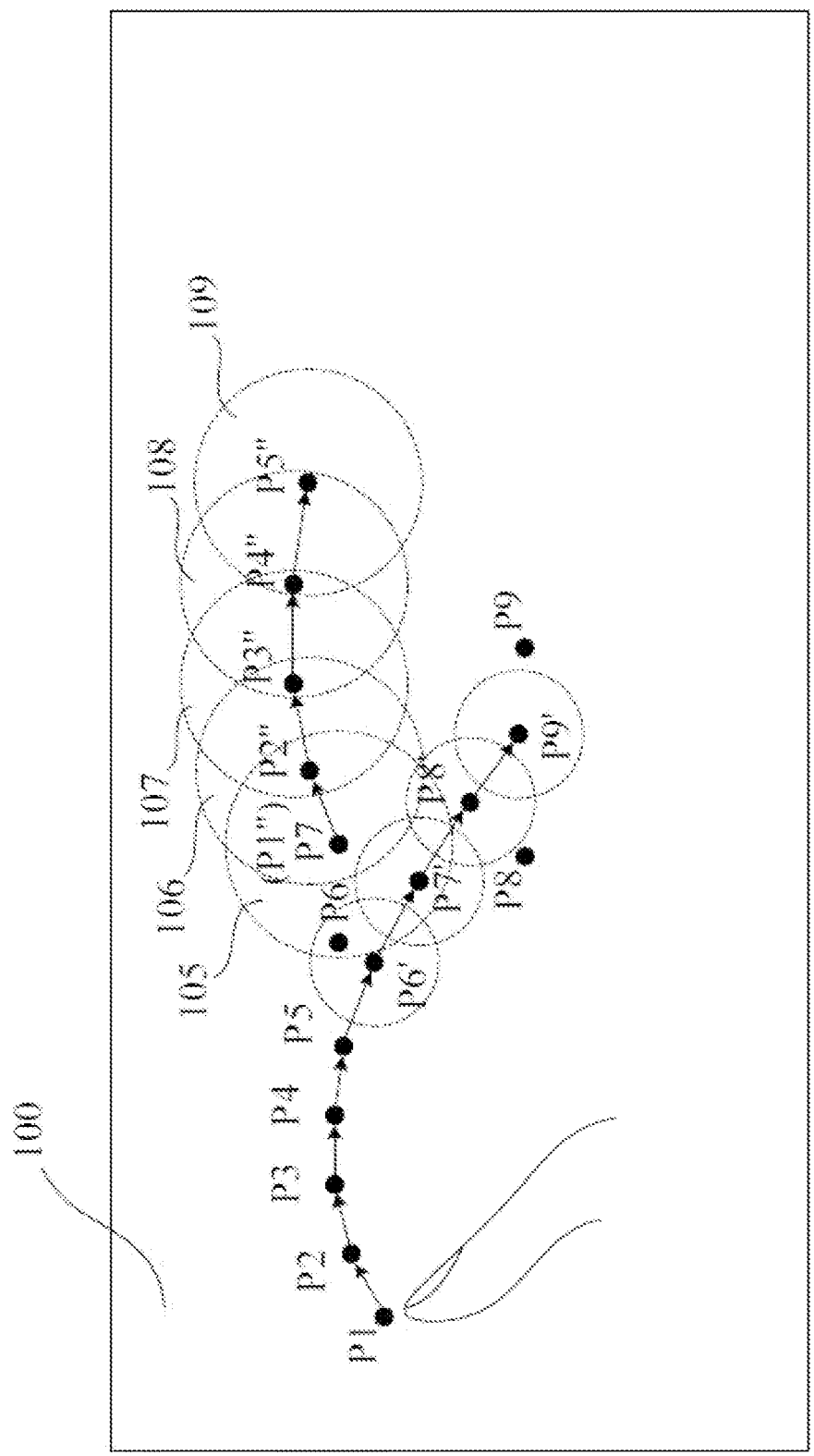
FIG. 4 is a schematic diagram of forming a new touch track on the touch screen in FIG. 1.
Figure 5:
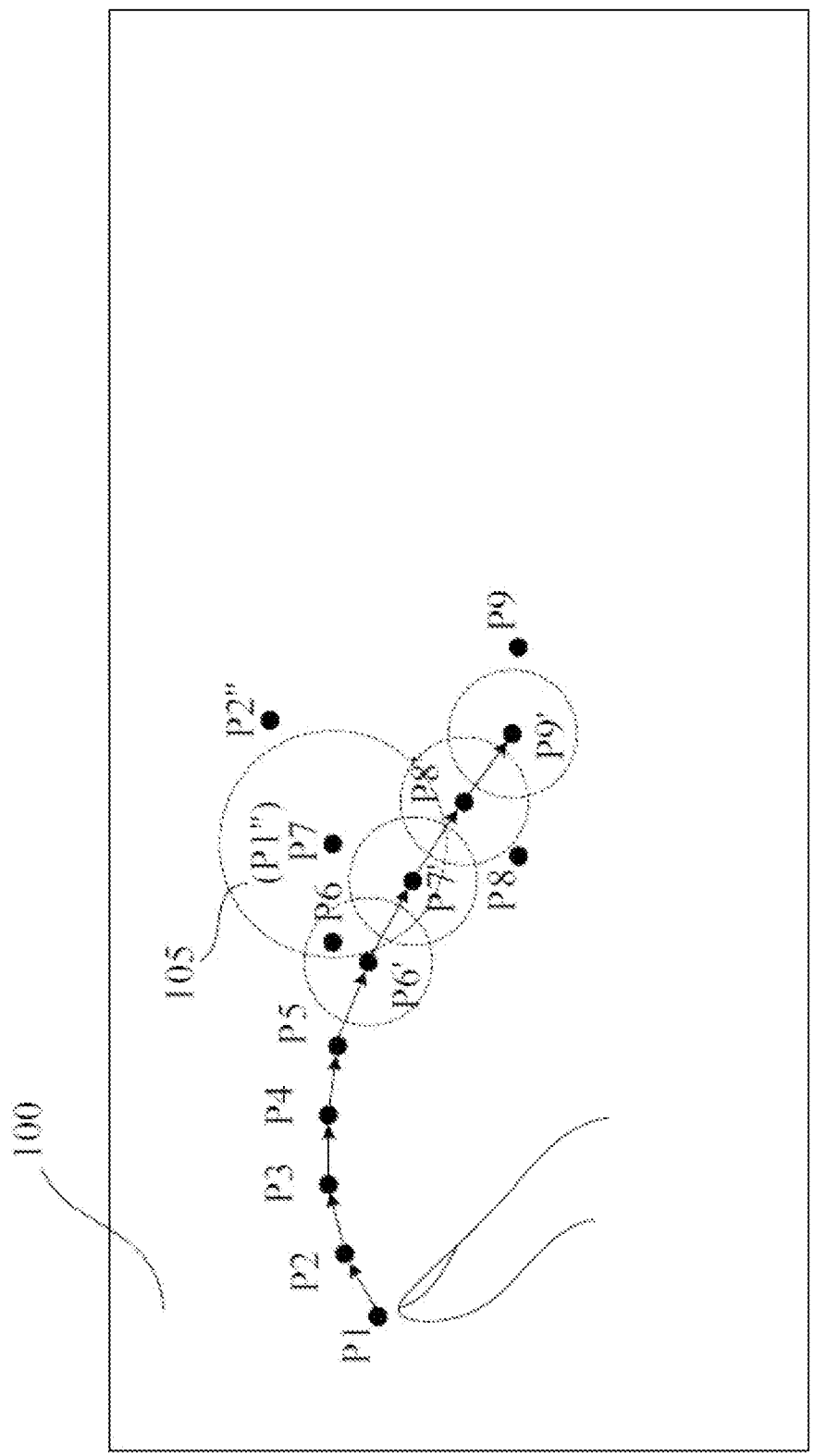
FIG. 5 is a schematic diagram of determining noise points on the touch screen of FIG. 1.

After determining the end of the last touch track, a new detected touch point can be determined again as to whether it will become start point of a new touch track or the noise point. For example, as shown in FIG. 4, detected touch point P7 acts as a first touch point P1" of a new touch track needed to be confirmed, and location scope 105 is set based on the detected touch point P7. Coordinate (x2", y2") of a detected touch point P2" is detected to locate in the location scope 105. Location scope 106 is set based on the detected touch point P2". Coordinate (x3", y3") of a detected touch point P3" is detected to locate in the location scope 106. Location scope 107 is set based on the detected touch point P3". Coordinate (x",y") of a detected touch point P4" is detected to locate in a location scope 107. Location scope 108 is set based on the detected touch point P4". Coordinate (x5", y5") of a detected touch point P5" is detected to locate in the location scope 108. At this time, the detected touch points from P1" to P5" are determined to constitute a new touch track, and thereby a new touch track function F(x", y", t") is defined. As shown in FIG. 5, if the detected touch point P2" is detected to locate beyond the location scope 105, the detected touch point P1" is confirmed and eliminated as a noise point. In an embodiment, a location scope can be a circle that is formed by taking the last detected touch point as the center of the circle and taking a detected empirical value as radius.

Figure 6:
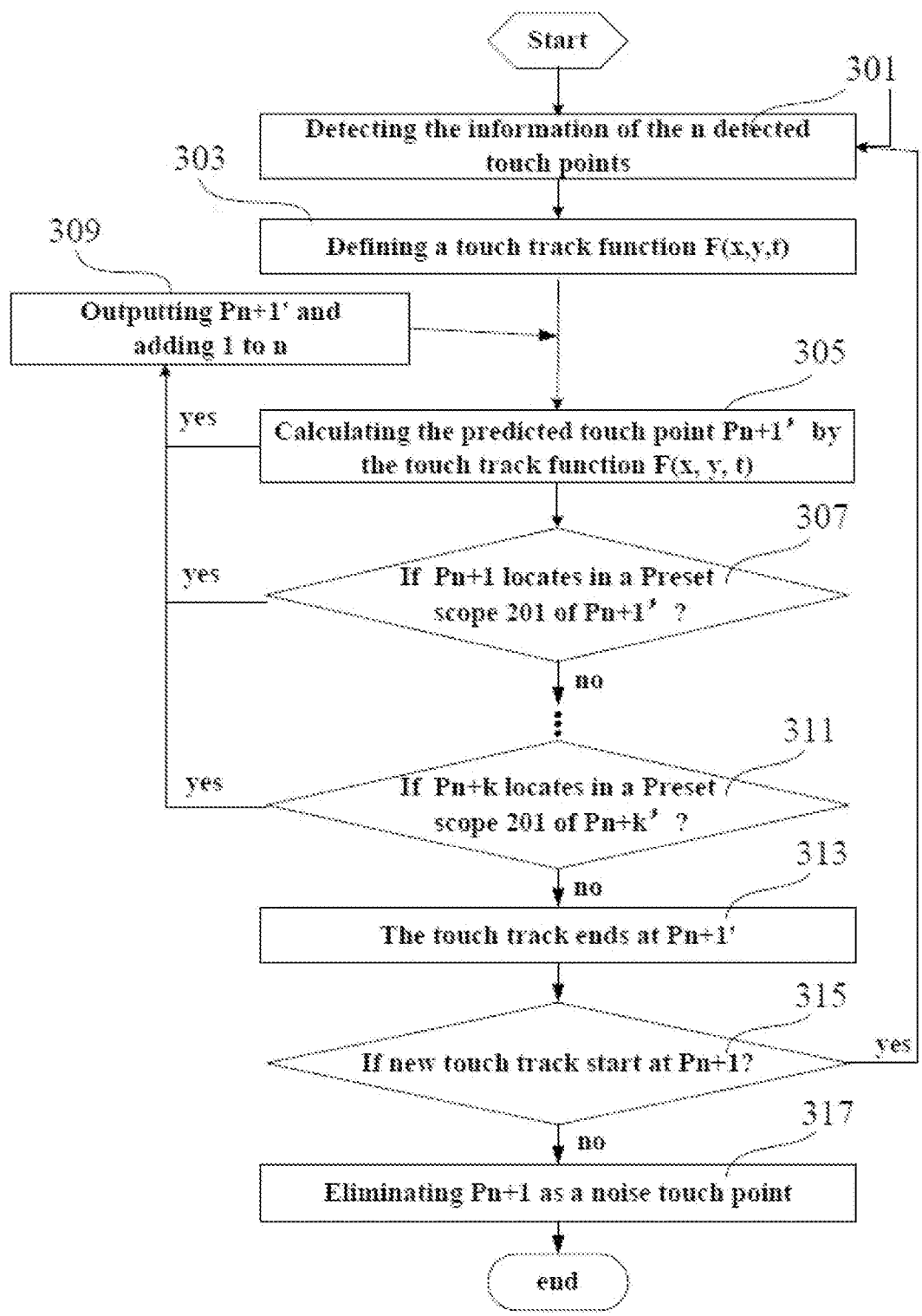
FIG. 6 is a flow chart of a touch tracking method for a touch screen.
Figure 7:
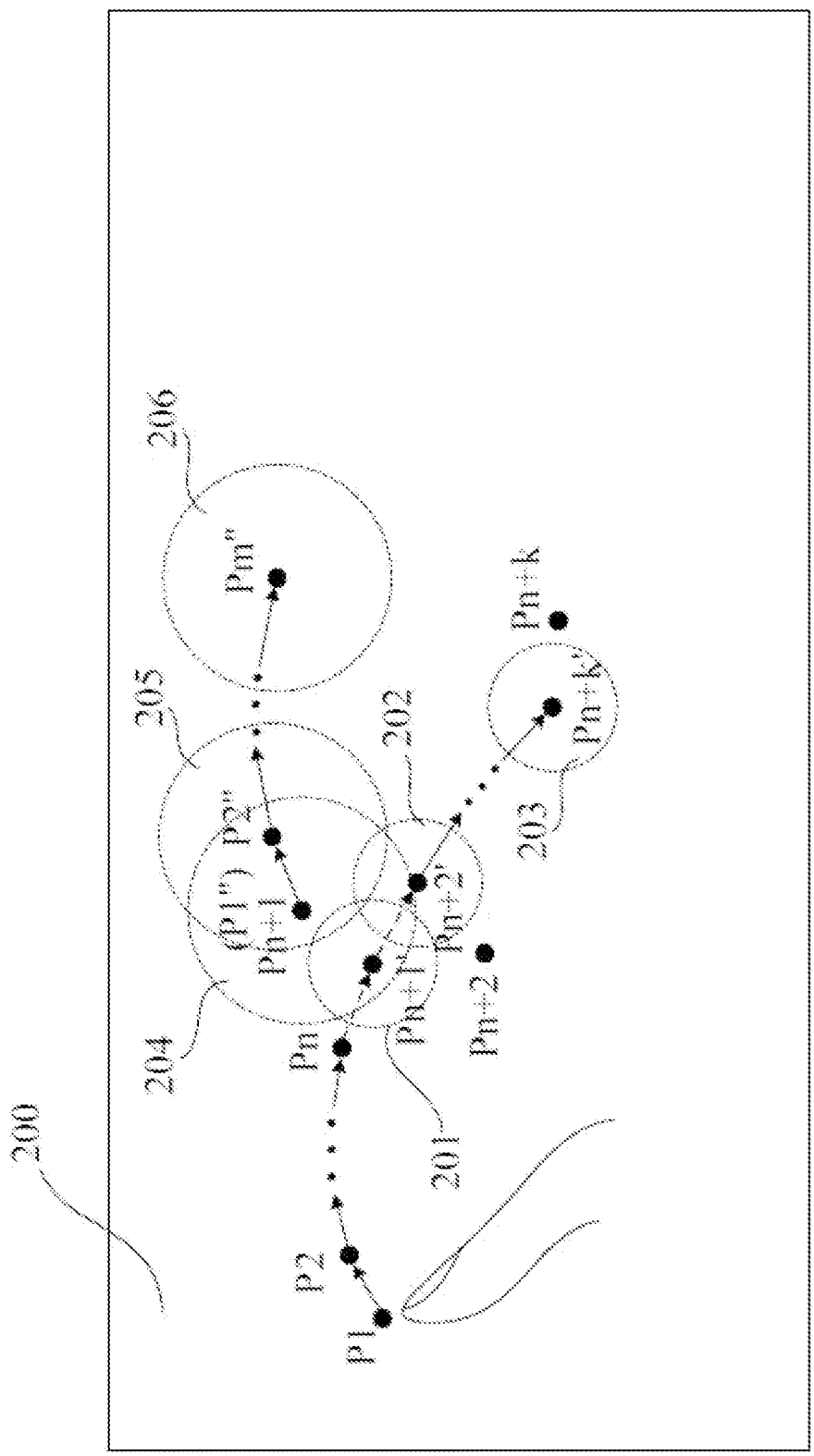
FIG. 7 is a schematic diagram of a touch track.

FIG. 6 is a tracking method on a touch screen 200 as illustrated in FIG. 7, and mainly includes the following steps:

In step 301, information of n detected touch points is detected, wherein the information can be coordinates and detecting times P1(x1, y1, t1), P2(x2, y2, t2) . . . Pn (xn, yn, tn), where n is not less than 3.

In step 303, the touch track function F(x, y, t) is defined by the parameters (x1, y1, t1), (x2, y2, t2) . . . (xn, yn, tn) of the detected points P1~Pn.

In step 305, a predicted touch point Pn+1' is calculated by the touch track function F(x, y, t).

In step 307, it is determined as to whether the detected touch point Pn+1 is located within a preset scope 201 of the predicted touch point Pn+1'. If the detected touch point is located in the preset scope 201, the method proceeds to step 309, else the method proceeds to step 311.

In step 309, the predicted touch point Pn+1' corresponding to the detected touch point Pn+1 is outputted as an output touch point and the method returns back to step 305 after adding 1 to n.

In step 311, it is determined as to whether the detected touch points from n+2 to n+k follow the sequence of steps 305 to step 307, wherein k is not less than 3. If the detected touch point Pn+k is located in the preset scope of the predicted touch point Pn+k' calculated by the touch track function F(x, y, t), the method proceeds to step 309. If the detected touch point Pn+k is not located in the preset scope of the predicted touch point Pn+k', the method proceeds to step 313.

In step 313, the touch track is determined to end at the predicted touch point Pn+1'.

In step 315, it is determined whether a new touch track starts at the detected touch point Pn+1. If the new touch track starts at the detected touch point Pn+1, the method proceeds to step 301, else, the process proceeds to step 317.

In step 317, the detected touch point Pn+1 is eliminated as a noise point.

The above-mentioned tracking method utilizes a touch track function defined by a known set of detected touch points to predict following touch points for tracking dynamic touch points. The method not only determines the relationship between detected touch points at different detecting times to draw the touch tracks, but also makes the touch track smooth and helps eliminate noise points effectively.

Figure 8:
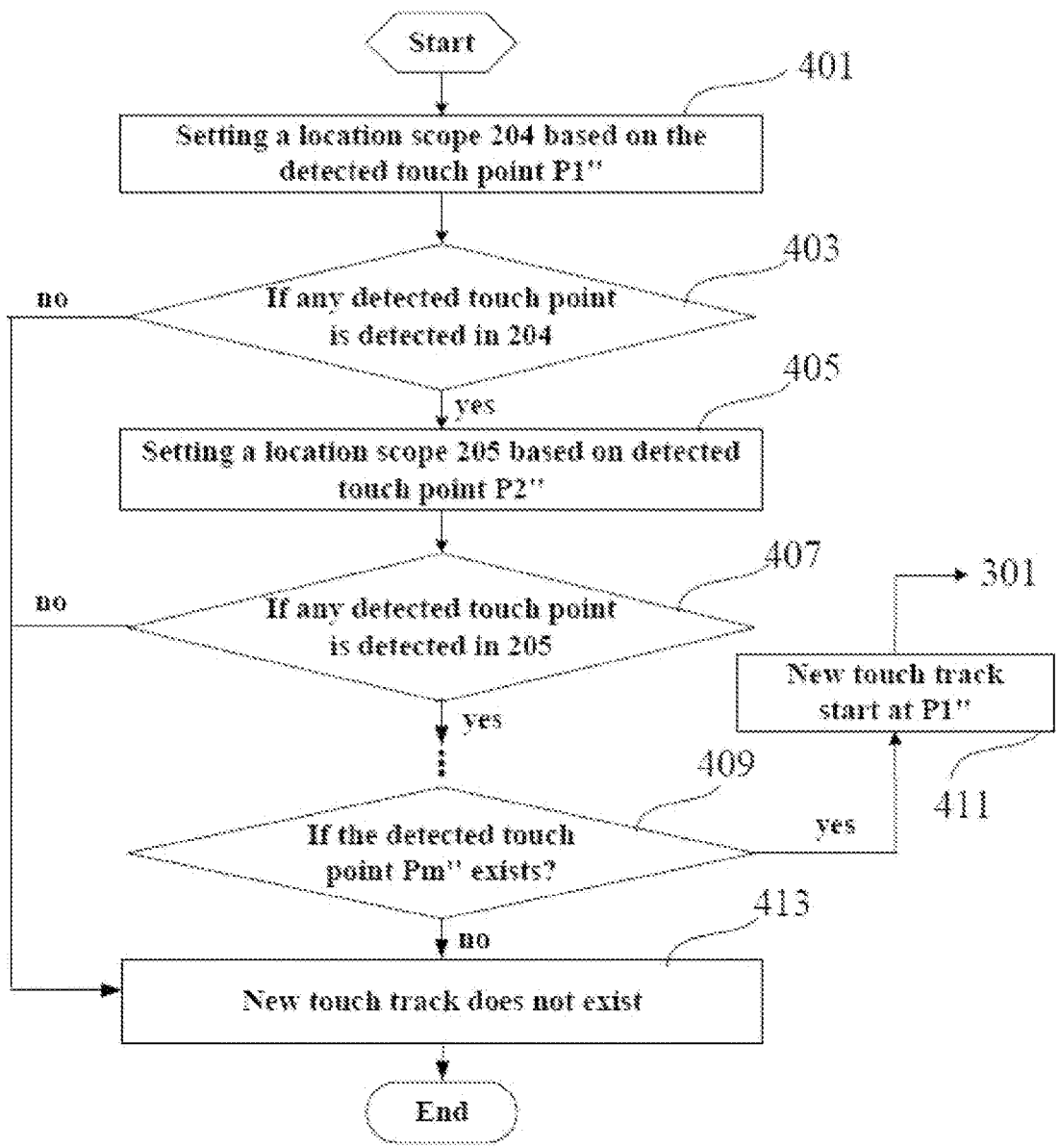
FIG. 8 is a schematic diagram of a method for determining for a new touch track on a touch screen.

FIG. 8, illustrates a method for determining whether a new touch track starts at a detected touch point Pn+1, wherein the method includes the following steps:

In step 401, the detected touch point Pn+1 is taken as a first detected touch point P1" of a new touch track to be determined, and a location scope 204 is set based on the detected touch point Pn+1.

In step 403, it is determined whether any detected touch point is detected within the location scope 204. If any detected touch point is detected within the location scope, the process proceeds to step 405, else the process proceeds to step 413.

In step 405, a detected touch point in the location scope 204 is taken as a second detected touch point P2" of the new touch track, and a location scope 205 is set based on the second detected touch point P2".

In step 407, it is determined whether any detected touch point is detected in the location scope 205. If any detected touch point is detected in the location scope 205, the process proceeds to step 409, else, the process proceeds to step 413.

In step 409, detected touch points from P2" to Pm" are determined in sequence by the method from step 405 to step 407. If the detected touch point Pm" of the new touch track exists, the process proceeds to step 411, else the method proceeds to step 413, wherein m is not less than 3.

In step 411, the new touch track is confirmed, wherein the new touch track starts at the detected touch point P1". The method then proceeds to step 301.

In step 413, it is confirmed that the new touch track does not exist.

In an embodiment, detected touch points used for defining a touch track of the present disclosure are placed successive to each other.

Figure 9:
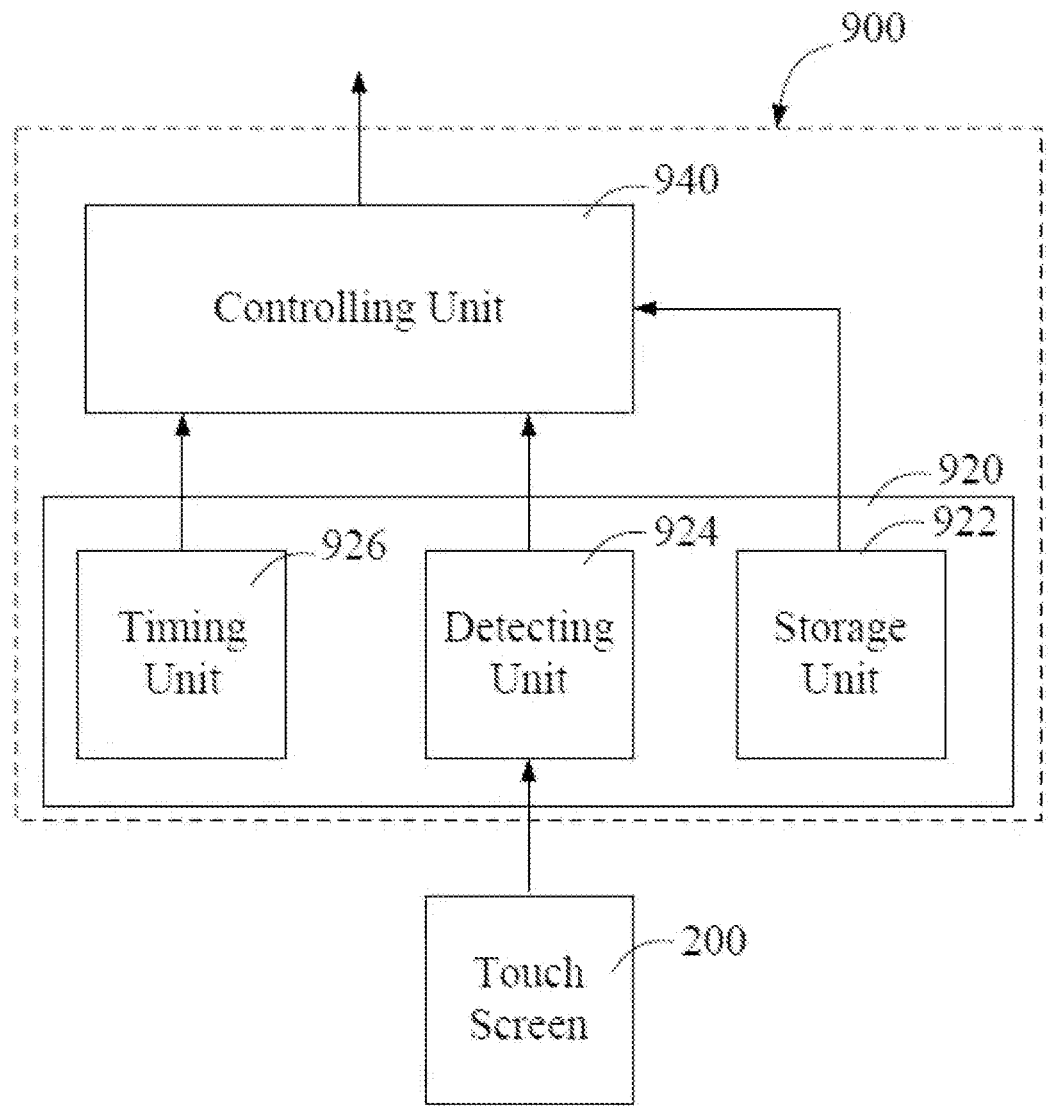
FIG. 9 is a schematic diagram of a touch tracking device for a touch screen.

Furthermore, a touch tracking device is also provided. As shown in FIG. 9, the touch tracking device 900 is used for tracking a touch track on the touch screen 200. The touch tracking device 900 includes an acquisition unit 920, and a controlling unit 940 connected to the acquisition unit 920. The acquisition unit 920 is used for detecting information of the detected touch points and further includes a storage unit 922, a detecting unit 924 and a timing unit 926. The information of the detected touch points includes coordinates and detecting times of the detected touch points.

In an embodiment, the detecting unit 924, connected to the touch screen 200, detects coordinates of the detected touch point occurring on the touch screen 200 by the user. For instance, coordinates of at least 3 detected touch points are detected.

In an embodiment, the timing unit 926 is used for monitoring the time. The timing unit 926 can also be an individual component to be integrated with the controlling unit 940, except for being included in the acquisition unit 920.

In an embodiment, the controlling unit 940 can be connected to the detecting unit 924 and the timing unit 926 and used for defining the touch track function based on the coordinates and the detected times of the detected touch points. Besides, the controlling unit 940 can calculate the predicted touch point according to the touch track function and determine whether the following detected touch point locates in the preset scope of this predicted touch point. Further, predicted touch point corresponding to a detected touch point can be outputted as the output touch point. Working structure and process of the controlling unit 940 is the same as the above-mentioned touch tracking method on the touch screen.

In an embodiment, the storage unit 922 can be used for storing detected empirical value. A preset scope can be set as a circle by taking a predicted touch point as the center of the circle and taking the detected empirical value as the radius. In addition, the preset scope can also be set as a circle, wherein the circle is formed by taking the predicted touch point as the center of the circle and taking half of the distance between predicted touch point and last detected touch point as the radius.

While certain embodiments have been shown and described, various modifications and substitutions may be made thereto without departing from the spirit and scope of the disclosure. Therefore, it is to be understood that the present disclosure has been described by way of illustrations and not limitations.

What is claimed is:

1. A touch tracking method for a touch track on a touch screen, comprising the steps of:
   a) defining a touch track function based on information of detected touch points;
   b) calculating a predicted touch point based on said touch track function;
   c) determining whether a next detected touch point, is located in a preset scope of said predicted touch point; and
   d) outputting said predicted touch point as an output touch point if said next detected touch point is located in said preset scope of said predicted touch point;
   e) ending said touch track at said predicted touch point if said next detected touch point is not located in said preset scope of said predicted touch point and if following k detected touch points are not located in preset scopes of respective predicted touch points, wherein k is not less than 3.

2. The touch tracking method of claim 1, wherein number of said detected touch points is not less than 3, further wherein said information of said detected touch points comprises coordinates and detected times of said detected touch pints.

3. The touch tracking method of claim 1, further comprising f) determining if following m detected touch points are located in location scopes of last detected touch points after e), wherein m is not less than 3.

4. The touch tracking method of claim 3, further comprising:
   g) eliminating a first detected touch point of said k detected touch points as a noise touch point if said m detected touch points are not located in said location scopes of said last detected touch points; and
   h) forming a new touch track by said in detected touch points starting at said first detected touch point of said k detected touch points if said m detected touch points are located in said location scopes of said last detected touch points.

5. The touch tracking method of claim 3, wherein each of said location scopes of said last detected touch points is a circle with said last detected touch point as center and a detected empirical value as radius.

6. The touch tracking method of claim 1, wherein said preset scope of said predicted touch point is a circle taking said predicted touch point as center and a detected empirical value as radius.

7. The touch tracking method of claim 1, wherein said preset scope of said predicted touch point is a circle taking said predicted touch point as center and half of a distance between last detected touch point and said predicted touch point as radius.

8. A touch tracking method for a touch track on a touch screen, comprising the steps of:
   a) detecting coordinates and detecting times of n detected touch points P1~Pn, P1(x1, y1, t1), P2(x2, y2, t2) . . . Pn(xn, yn, tn), wherein n is not less than 3;
   b) defining a touch track function F(x, y, t) by said coordinates and said times (x1, y1, t1), (x2, y2, t2) . . . (xn, yn, tn);
   c) calculating a predicted touch point Pn+1' by said touch track function;
   d) determining if a detected touch point Pn+1 is located in a preset scope of said predicted touch point Pn+1'; and
   e) outputting said predicted touch point Pn+1' as an output touch point if said detected touch point Pn+1 is located in said preset scope of said predicted touch point Pn+1'.
   f) determining detected touch points from n+2 to n+k in sequence by c) to d) if said detected touch point Pn+1 is not located in said preset scope of said predicted touch point Pn+1', and wherein k is not less than 3.

9. The touch tracking method of claim 8, wherein e) further comprises returning to c) after adding 1 to n.

10. The touch tracking method of claim 8, further comprising:
    g) ending said touch track at said predicted touch point Pn+1'.

11. The touch tracking method of claim 10, further comprising: h) determining if following m detected touch points are located in location scopes of last detected touch points after g), wherein in is not less than 3.

12. The touch tracking method of claim 11, further comprising:
    i) eliminating a first detected touch point of said k detected touch points as a noise touch point if said following m detected touch points are not located in said location scopes of said last detected touch points; and
    j) forming a new touch track by said m detected touch points starting at first detected touch point of said k detected touch points if said following m detected touch points are not located in said location scopes of said last detected touch points.

13. The touch tracking method of claim 11, wherein each of said location scopes of said last detected touch points is a circle taking last detected touch point as center and a detected empirical value as radius.

* * * * *